United States Patent [19]

Audiffred, Jr. et al.

[11] 4,248,330
[45] Feb. 3, 1981

[54] CONTROL SYSTEM TO APPLY VEHICLE BRAKES DURING A TRANSMISSION DIRECTIONAL SHIFT

[75] Inventors: Sidney J. Audiffred, Jr., Washington; David S. Ohaver, Canton, both of Ill.

[73] Assignee: Caterpillar Tractor Co., Peoria, Ill.

[21] Appl. No.: 798,054

[22] Filed: May 18, 1977

Related U.S. Application Data

[63] Continuation-in-part of Ser. No. 566,501, Apr. 9, 1975, abandoned.

[51] Int. Cl.² ............................................ B60K 29/02
[52] U.S. Cl. .................................................. 192/4 C
[58] Field of Search ...................... 192/4 A, 4 C, 13 R

[56] References Cited

U.S. PATENT DOCUMENTS

| 3,381,770 | 4/1966 | Fauchere | 192/4 C |
| 3,437,184 | 4/1969 | Wilson | 192/13 R |
| 3,606,906 | 9/1971 | Shore | 192/4 C |
| 3,831,721 | 8/1974 | Shore | 192/4 C |
| 3,841,450 | 10/1974 | Drone et al. | 192/13 R |
| 3,858,696 | 1/1975 | Shore | 192/4 C |
| 3,910,389 | 10/1975 | Pleier | 192/4 C |
| 3,998,111 | 12/1976 | Blake | 192/4 A |

Primary Examiner—George H. Krizmanich
Attorney, Agent, or Firm—Phillips, Moore, Weissenberger, Lempio & Majestic

[57] ABSTRACT

A hydraulic control system for a multi-directional multi-speed transmission for the power train of a vehicle includes means responsive to the directional shift of the transmission at a predetermined minimum speed to automatically apply the brakes of the vehicle during a shifting period.

6 Claims, 4 Drawing Figures

PREFERRED SYSTEM

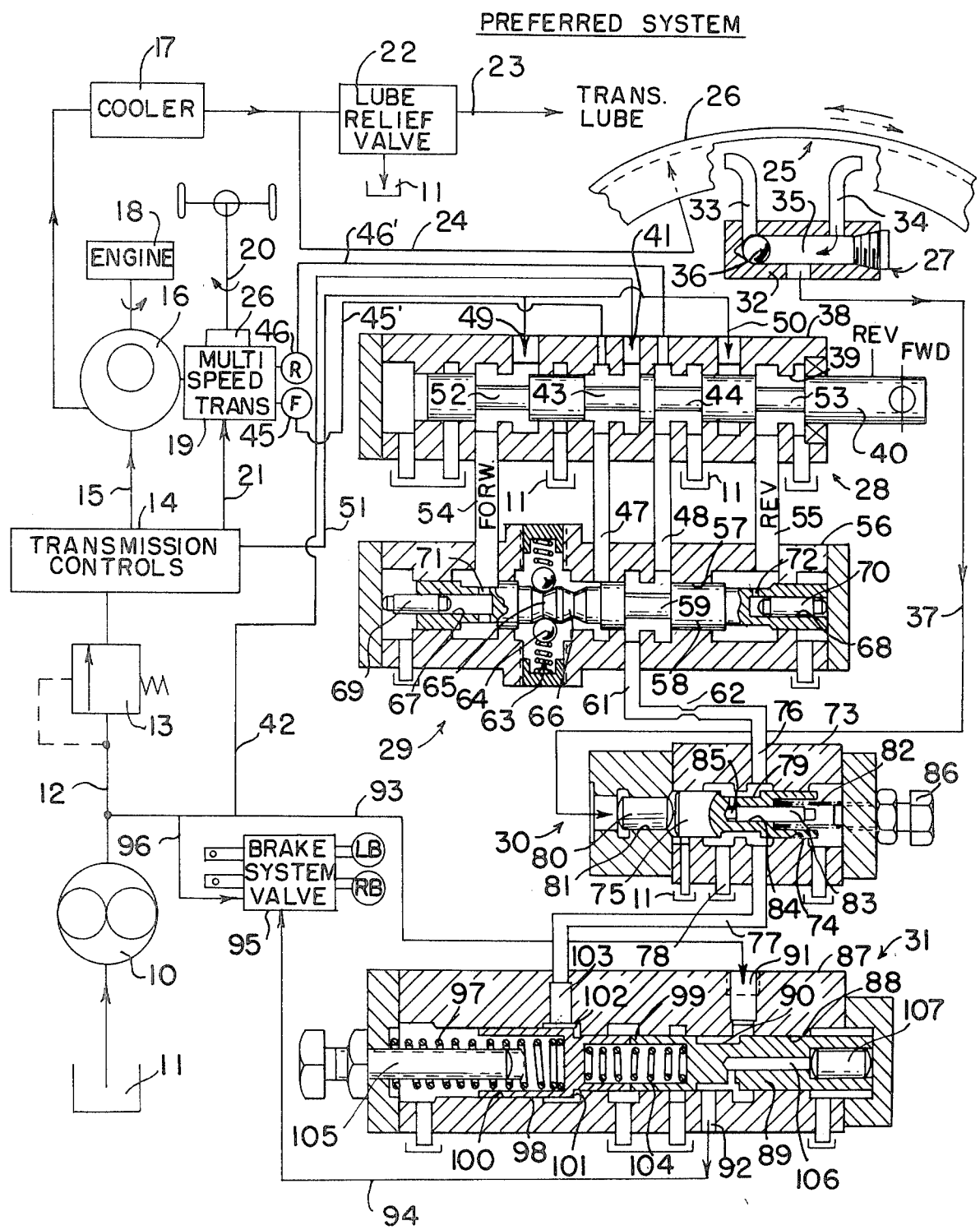

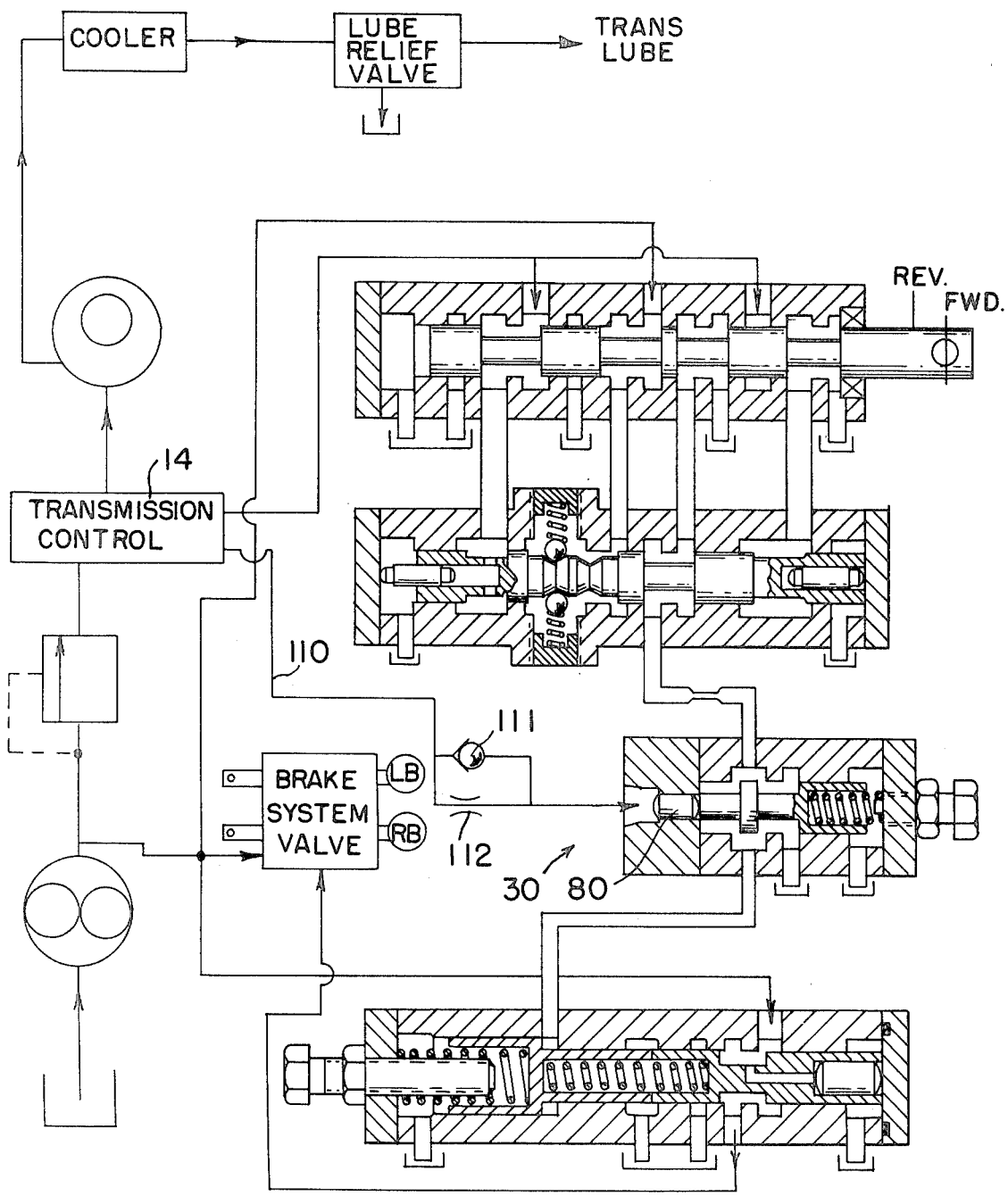

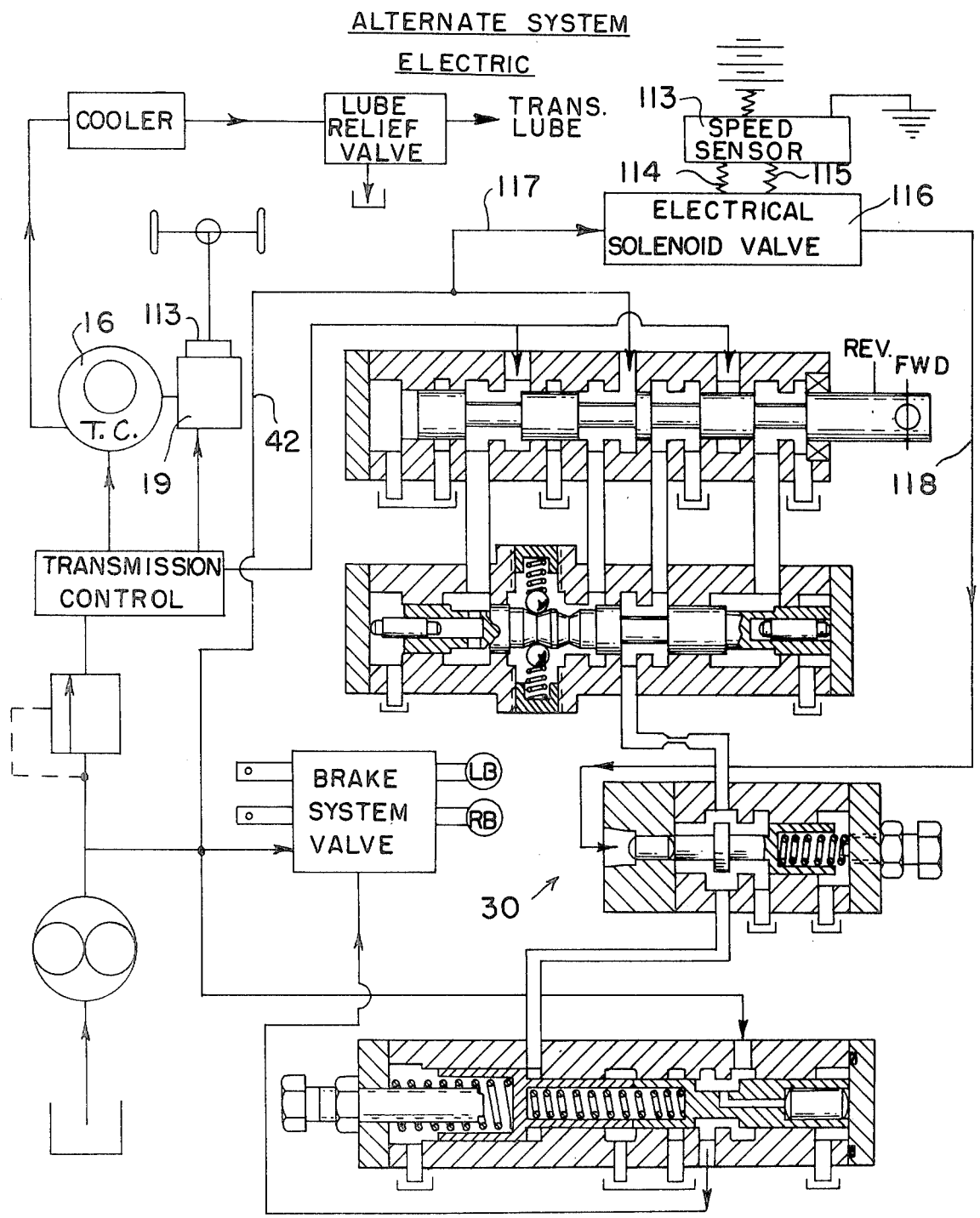

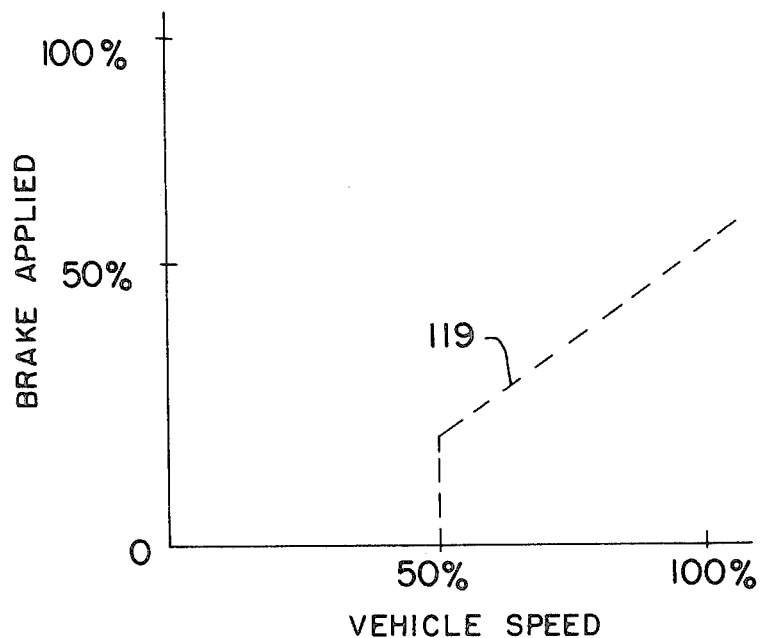
Fig-4-
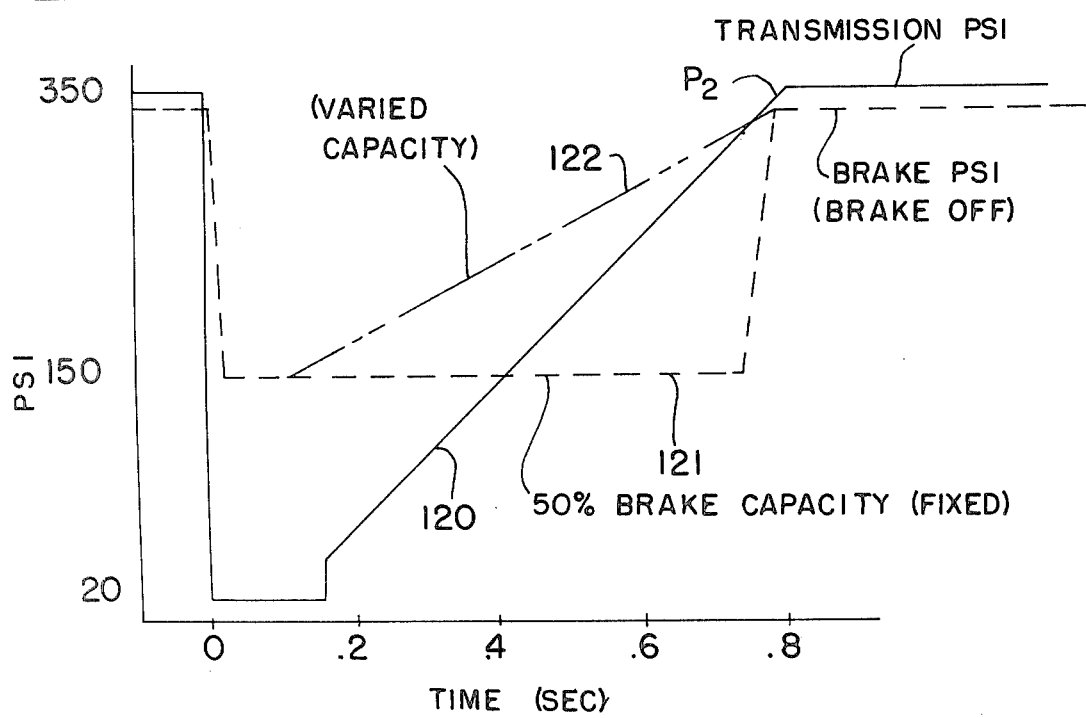
Fig-5-

CONTROL SYSTEM TO APPLY VEHICLE BRAKES DURING A TRANSMISSION DIRECTIONAL SHIFT

CROSS-REFERENCE TO RELATED APPLICATION

This is a Continuation-In-Part of application Ser. No. 566,501 filed Apr. 9, 1975, now abandoned.

BACKGROUND OF THE INVENTION

The present invention relates to control systems and pertains particularly to control systems for simultaneously applying brakes to a vehicle in response to a shift in the direction of the vehicle.

Heavy-duty earth-working vehicles are frequently operated in a manner to require frequent shifting between forward and reverse directions. This frequent reversal of directions is required in order to most efficiently and effectively utilize the machine. This reversal of direction frequently occurs at a very high speed in order to obtain the most efficient use of the machine. One problem with such high-speed reversal of direction is that the energy of the vehicle must be somehow dissipated before the vehicle is put into the reverse direction.

Numerous approaches to this problem have been proposed in the past. However, such prior art approaches to this problem have drawbacks.

The prior art approaches to this problem are exemplified in the following U.S. Pats. No. 3,348,644 issued Oct. 24, 1967 to Hilpert; No. 3,437,184 issued Apr. 8, 1969 to Wilson; No. 3,540,556 issued Nov. 17, 1970 to Snoy et al; No. 3,540,559 issued Nov. 17,. 1970 to Shore; and No. 3,604,544 issued Sept. 14, 1971 to Floyd C. Ross.

Among the drawbacks of these prior art systems is that they apply the vehicle brakes regardless of the speed of the vehicle. The problem with this approach is that it actuates the brakes of the vehicle at such slow speed that it unnecessarily interferes with the operation of the vehicle. That is, the brakes are cycled during the shift between the forward and reverse, or vice versa, regardless of the speed.

At very low speeds the transmission and clutch system of a vehicle can absorb the momentum of the vehicle without undue stress thereof and thus save the time required for the brake systems to sequence. Thus, a considerable savings in time and operation of control systems is achieved.

SUMMARY AND OBJECTS OF THE INVENTION

It is a primary object of the present invention to overcome the above problems of the prior art.

Another object of the present invention is to provide a control system for a multi-speed multi-directional vehicle that includes means for automatically applying the brakes of the vehicle at predetermined speeds of the vehicle when this is to be shifted between forward and reverse directions.

A further object of the present invention is to provide a hydraulic control system for a multi-directional transmission for the power train of a vehicle with means responsive to directional shift of the system at a predetermined minimum speed of the vehicle to automatically apply the brakes during the shifting between directions.

In accordance with the primary aspect of the present invention, a hydraulic control system to provide modulated pressure signals and to release the vehicle brakes is disclosed in combination with a vehicle transmission having forward and reverse drives including hydraulically actuated forward and reverse clutches. The control system includes a source of pressurized hydraulic fluid in a device for sensing speed to generate a pressure signal in response and proportional to a predetermined minimum output of the transmission. A system is included for a dump valve subsystem and a reducing valve subsystem. The transmission, in its directional selector valve system communicates with the source of pressurized fluid and is shiftable to forward and reverse positions to selectively direct pressurized hydraulic fluid from this source of hydraulic fluid to either one of the forward or reverse clutches in the transmission and to the brake application system while simultaneously communicating the transmission control system modulated pressure signal to the brake application system. The sequence valve subsystem communicates with the directional selector valve system and is responsive to the modulated signal for controlling communication of the pressurized hydraulic fluid to the dump valve system from the directional selector valve system. The dump valve system interposed between the sequence valve in the reducing valve systems is responsive to the first pressure signal for controlling the communication of the pressurized hydraulic fluid from the sequence valve system to the reducing valve system. The reducing valve subsystem is variably responsive to the pressurized hydraulic fluid received from the dump valve system for communication of the variable pressure from the source of fluid pressure to the brakes for controlling the release of the vehicle brakes.

BRIEF DESCRIPTION OF THE DRAWINGS

The above and other objects and advantages of the present invention will become apparent when read in conjunction with the drawings wherein:

FIG. 1 is a schematic layout of the preferred embodiment of the present invention;

FIG. 2 is a schematic layout of an alternate embodiment of a system in accordance with the present invention;

FIG. 3 is a schematic illustration of a further embodiment of a hydraulic control system in accordance with the present invention; and FIG. 4 is a graph of percent of a predetermined vehicle speed versus percent of brakes applied;

FIG. 5 is a graph of pressure versus time in the present varied capacity system to the systems of the prior art.

DETAILED DESCRIPTION OF PREFERRED EMBODIMENTS

Turning now to the drawings and particularly FIG. 1, there is illustrated a schematic layout of the preferred embodiment of the present invention. The present system is basically a control system for a multi-speed multi-directional vehicle transmission. The system generally comprises a source of pressurized fluid including a hydraulic pump 10 drawing fluid from a reservoir 11 supplying it by way of suitable conduit means 12 and a priority valve 13 to a transmission speed control system 14. A transmission speed control circuit of the type envisioned here is described in U.S. Pat. No. 3,998,111 issued Dec. 21, 1976. The fluid is transmitted by way of a conduit 15 to a torque converter 16 and thence to a cooler 17.

The torque converter 16 is drivingly connected to a feasible engine 18 and to a multi-speed transmission 19 which includes an output shaft 20 for drivingly engaging the wheels of the vehicle for rotating them in the forward or reverse direction. The transmission 19 may be any suitable well-known type having at least a plurality of forward speeds and at least one reverse speed, but is preferably of a type having multi-forward and multi-reverse drives. The output shaft 20 of the transmission is operatively connected to the drive wheels of the vehicle. The transmission itself is of the type wherein various speeds are established by the engagement of clutches or brakes within the transmission through the use of modulated fluid pressure for establishing drive channels through the transmission. The transmission speed control group 14 is operatively connected by a suitable control line or conduit or systems of conduits generally referred to by the numeral 21 for shifting a transmission among its various speeds. The speed control group 14 is of the type that provides modulated fluid pressure at least upon a directional shift.

The fluid, after leaving the cooler 17, divides and flows either by way of lube relief valve 22 and lube conduit 23 to lube the transmission and/or by way of conduit 24 to an annular chamber 25 formed in annular container 26 which is mounted on the output shaft 20 of the transmission 19 for purposes as will be described.

The heart of the present system lies in the novel construction arrangement and interconnection of the following elements. These include a speed sensing mechanism 27, a directional selector valve 28, a two-piston sequencing valve 29, a dump valve 30 and a reducing valve 31.

The speed sensing means 27 includes a body member 32 which is secured to a stationary portion of the transmission or the like and includes a pair of pitot tubes 33 and 34 having the ends thereof extending into the annular container 26 for receiving an impact of fluid therein and directing the fluid into a chamber 35 wherein a ball valve 36 is operative to permit the fluid to flow from its respective pitot tube to an outlet conduit 37 for communicating with the dump valve 30. The annular container 26 is mounted on the output shaft 20 of the multi-speed transmission 19 fluid contained therein impacts against the opening of the respective pitot tubes 33 or 34 depending on the direction of rotation of the member 26 and thereby builds a fluid pressure within the tubes 33 or 34 which acts through the chamber 35 at conduit 37 to valve 30 to act as a control pressure thereon. The speed sensing means 27 will operate with either direction of motion of member 26 and, as indicated, with the motion in the direction indicated by the solid arrow the fluid within the container 26 will flow into the tube 34 as indicated by the arrow and out conduit 37 for supply to the dump valve 30. When operating in the reverse direction as indicated in the broken arrow, the flow of fluid will be along pitot tube 33 at which time the valve 36 will move to the opposite end of chamber 35 to permit the flow of fluid out of the chamber by way of conduit 37 to the valve 30.

The directional selector valve 28 includes a valve body 38 having a central bore 39 in which is mounted a valve spool 40 for controlling communication between a plurality of inputs and outputs to the valve body. A first inlet 41 of valve 28 is supplied with pressurized fluid by way of conduit 42 from supply line 12 upstream of priority valve 13. The valve spool 40 includes a pair of annular grooves 43 and 44 which are operative upon movement of the valve to selected ones of forward or reverse to direct fluid from inlet 41 to either one of forward clutch 45 or the reverse clutch 46 associated with multi-speed transmission 19. This establishes either a forward or a reverse drive of the output 20 of transmission 19 and thus the vehicle. These annular grooves 43 and 44 are also operative in the respective positions to selectively communicate fluid from the inlet 41 to either one of outlets 47 or 48 to position sequence valve 29.

A second set of inlets 49 and 50 receive modulated fluid by way of conduit 51 from the transmission control group 14. This pressure of this fluid is modulated from a relatively low fill pressure to the clutch engaged pressure dictated by the relief setting in the transmission control 14. The valve spool 40 includes a second set of annular grooves 52 and 53 which are operative to selectively provide communication between either inlet 49 and an outlet 54 or the inlet 50 and an outlet 55, both of which outlets communicate to sequencing valve 29.

It will also be noted that when valve 40 is shifting, for example, to the forward position as illustrated, inlet 41 communicated with forward clutch 45 and with passage 47 while at the same time the annular groove 44 establishes communication between reverse clutch 46, sump 11 and the passage 48. This effectively vents not only the clutch 46 but also the system in communication with the conduit or passage 48.

The two-position sequence valve 29 times the brake application during vehicle directional shift and includes a valve body 56 having a cylindrical bore 57 in which is reciprocally mounted a valve spool 58 which is operative to provide communication between either one of inlet conduits or passages 47 and 48 and an outlet conduit, or passageway 61 which communicates with the dump valve 30. The outlet conduit 61 includes a restriction 62 for restricting the volume of fluid communicated therethrough to the dump valve 30.

The valve spool 58 of sequence valve 29 is movable between either one of two positions determined by and held in position by means of detent mechanism 63 which includes a plurality of ball elements 64 biased into one of two grooves 65 and 66 formed on the valve spool 58.

Valve spool 58 is shifted to either one of its positions by means of modulated fluid pressure received from transmission controls 14 and communicated by way of either one of conduits or passageways 54 and 55 to act on either end of the valve spool 58. The valve spool includes at either end a pair of bores 67 and 68 in which are mounted a pair of slugs or pistons 69 and 70 which engage the ends of the housing 56. Each of the bores 67 and 68 defines a chamber in combination with the respective pistons or slugs to which chamber fluid is communicated by means of passages 71 and 72.

Thus, with this arrangement, when fluid under sufficient pressure is communicated by way of conduit 54 and passage 71 to the chamber defined by bore 67 acting on slug 69 and spool 58, the pressure biases the spool to the right as illustrated. In this position communication is established across groove 59 between line 48 and line 61 to valves 30 and/or 31. However, when the modulated fluid pressure is communicated thereto as a result of a directional shift and by way of conduit or passage 55 and 72 to the chamber defined by bore 68 and piston 70, the pressure when sufficient acts on the slug 70 to move it to the right and acts on the spool 58 to move in to the left. This position of spool 58 establishes communication across groove 59 between line 47 and line 61 to valves 30 and/or 31. It will become apparent that sequence valve 29 permits brake relieving pressure to pass-groove 59 for a time interval determined by the spring rate of detent 63 and the rate of pressure change in line 51.

The dump valve 30 limits vehicle brake application during directional shifts to above a certain percent of vehicle speed and includes a valve body 73 having a cylindrical bore 74 formed therein and a spool 75 reciprocally mounted in the bore 74 for controlling communication of fluid between an inlet 76 and an outlet return passage 78 to sump tank 11. The valve spool 75 includes an annular groove 79 which is operative to provide communication between the inlet 76 and the return passage 78 to sump 11. The valve spool 75 is biased to its rightward position by means of a piston 80 mounted in a bore 81 on which pressurized fluid from conduit 37 acts. A spring 82 acts on the opposite end of the valve spool for biasing the spool towards the left. In addition to the spring 82, piston 83 is mounted within a bore 84 within the piston 75 to which is communicated fluid by way of passage 85 through the valve. The fluid within the chamber of passage 85 acting on the piston 83 acts to bias the spool 75 toward the left.

When the spool 75 is biased to the left as shown, pressurized fluid in line 76 is dumped via groove 79 and line 78 to sump 11. However, when the spool 75 is biased to the rightward position under the influence of pressurized fluid in line 37, communication between lines 76 and 78 is cut off and the pressurized fluid 61, 76 is communicated to valve 31.

The reducing valve 31 modulates the application of vehicle brakes during a direction shift and includes a housing 87 having a bore 88 in which is mounted a spool 89 having an annular groove 90 for controlling communication between an inlet 91 and an outlet 92. The valve 31 is operative to control communication of fluid from a suitable source such as from the main pump 10 by way of conduit means 93 to inlet 91, outlet 92 and by way of conduit means 94 to a brake valve system 95. The brake valve system 95 is operative to control the direction of fluid by way of conduit 96 from the source 10 to control the brakes of the vehicle. In the illustrated embodiment the brakes are for a vehicle such as a crawler tractor and include left brakes and right brakes which are spring-applied and pressure-released. That is, when the pressure in the system falls below a certain pressure, the springs automatically apply the brakes of the vehicle.

The valve spool 89 is biased to its open communication position as shown by means of a suitable spring 97 biased against the left end of the housing. A second spool or piston 98 engaging the spool 89 at a point 99 and having the major portion thereof mounted within a cylindrical bore 100 concentric with and larger in diameter than bore 88. The spool or piston 98 includes an annular face 101 defined at the juncture of the different diameters thereof and extending into means defining a pressure chamber 102 to which is communicated an inlet 103 for communicating pressurized fluid by way of conduit 77 to the chamber 102. A spring 104 is disposed between the spool 89 and spool or piston means 98 to bias them or tend to bias them apart. Suitable adjustable stop means such as a screw or bolt 105 is mounted in the housing for providing adjustable stop means for leftward movement for piston 98.

The operation of the FIG. 1 embodiment is such that when the rotatable member 26 achieves sufficient speed to develop pressure within either one of pitot tubes 33 or 34 that pressure is communicated by conduit means 37 to act on piston or slug 80 which acts to push the valve spool 75 in dump valve 30 to the right to cut off communication between conduit 76 and sump 11 by way of return line 78. At this point, should spool 40 of valve 28 be shifted to the reverse position, communications will be established between inlet 41 and reverse clutch 46, and at the same time with conduit 48. The flow of fluid along conduit 48 will pass across valve spool 58 at groove 59 and communicate by way of conduit 61 with valve 30 where it crosses at annular groove 79 to communicate with conduit 77 and inlet 103 of the reducing valve 31 where it acts on piston face 101, moving it to the left. This leftward movement of piston 98 separates the piston from spool 89 at abutment point 99 and permits the spool 89 to move to the left under pressure within conduit line 93. The pressure from conduit 93 communicates with inlet 91 and annular groove 90 where it then communicates by way of a passage 106 with a piston or slug 107 in the end of spool 89 to bias the spool to the left, wherein the edge of the annular groove 90 tends to cut off communication between inlet 91 and outlet 92. This would tend to reduce the pressure communicated by way of line 94 to brake valve system 95 and thus permit the spring of the brake system to overcome the pressure therein and apply the brakes of the system. This permits the brakes of the vehicle to apply and absorb some of the momentum of the vehicle during the directional shift. This system is modulated to apply the vehicle brakes at a varied capacity during a directional shift in proportion to the vehicle speed.

Also, it will be noted that when spool 40 is shifted to the left for a reverse shift, increasing pressure as indicated at line 120 (FIG. 5) is communicated to inlet 50 and is further communicated by way of annular groove 53 with passage or conduit 55 to the right end of spool 58 of the sequence valve 29 where it acts on slug 70 to shift the spool 58 to the left only when clutch fill pressure is sufficient to overcome the detent spring pressure acting on detent balls 6A. Shifting the spool to the left cuts off communication between conduits 48 and 61 and thus the fluid acting on the pressure-reducing valve 31. The spool 58 will then be held in the detent position in groove 66 establishing the reverse condition. When this has occurred, the pressure cut off from chamber 102 of reducing valve 31 permits the spool 89 to move again to the right for full open position of the annular groove 90 to permit communication between conduit 93 and 94 and full communication of fluid to the brake system valve 95 for releasing the vehicle brakes.

It should be noted that the pressure developed by the speed sensing means 27 is proportional to the speed of the vehicle and thus at low vehicle speeds insufficient pressure is developed to actuate the valve 30 and thus the brakes are not applied.

Turning now to FIG. 2, in this embodiment the speed-sensing control is eliminated and control of the dump valve 30 is obtained by a signal from the transmission control system 14. In one embodiment when the transmission is in a relatively high gear, such as third gear for example, in either forward or reverse, fluid is communicated by way of conduit 110 to the valve 30 to act on the slug 80 and shift the spool to the right. The conduit 110 includes a reverse check valve 111 and restricting means 112. The remaining portions of the system are identical and function in an identical manner as described above. Thus the control and position of the dump valve 30 depends on a signal from the transmission control system 14 and preferably a control from a higher gear of the transmission system.

Preferably the brakes are applied during a directional shift from a higher gear with the brakes being applied at a fixed amount of 50% brake capacity, for example, during clutch fill and pressure modulation. The brakes then are automatically released as previously described as transmission clutch pressure approaches maximum setting.

Turning now to FIG. 3, a still further embodiment of the present invention is illustrated wherein the basic system is identical to previous embodiments with the exception that the speed-sensing means is modified. In this embodiment suitable speed-sensing means, such as an electrical generator or the like 113 is connected to the output of the vehicle transmission and generates a signal proportional to the output speed, which signal is transmitted by way of suitable conductors 114 and 115 for operation of a valve 116. The valve 116 is solenoid-operated and controls a source of pressurized fluid by way of a conduit 117 connected to conduit 42 and a conduit 118 for transmitting pressurized fluid to control the dump valve 30. With this arrangement an electrical signal proportional to the output speed of the vehicle transmission will be generated by the generator 113 and transmitted to control solenoid-operated valve 116. This valve will be operated in proportion to the speed to thus transmit a signal by way of 118 to control valve 30. The valve 30 will shift rightwardly thus control the braking of the vehicle during a change in directional shift of the vehicle. This arrangement thus lets a portion of the energy of the vehicle be taken up by the brakes of the vehicle rather than the transmission during a directional shift.

FIG. 4 is a graph showing the relationship of the percent of predetermined vehicle speed versus brakes applied. It is apparent the brakes will not be applied if the vehicle is traveling at a speed of less than 50% of the vehicle speed. However, should the vehicle be traveling at least 50% or above the predetermined speed when directional shift should occur, the brakes will be applied in proportion to the speed above that particular percentage of the vehicle speed. For example, at or slightly above 50% of the vehicle speed approximately 15-20% of the braking effort is applied. However, should the vehicle be moving at a rate of approximately 100% of its predetermined speed, then slightly over 50% of the braking effort is applied to the brakes.

The FIG. 5 graph illustrates a pressure vs. time graph of the pressure to the transmission controls 14 relative to or as compared to a fixed-capacity brake system and a variable-capacity brake system. The line 120, for example, represents the pressure to the transmission control 14 during the shifting phase. Such as, for example, when reverse is selected the pressure in the transmission clutches drops during clutch fill to a value of approximately 20 psi for a time of less than two-tenths of a second and then increases to approximately the normal 350 psi in about six-tenths of a second. During the time that the transmission pressure is varying in this amount, a fixed-capacity brake system such as is shown in FIG. 2 or FIG. 3 and as illustrated by line 121 will have the brake-releasing pressure drop immediately from a value of, say, approximately 350 psi to a value of 150 psi and remain constant at that level for approximately eight-tenths of a second so that the brake capacity is applied at a fixed capacity during that period of time. This action occurs over the same period of time at which the pressure within the transmission clutch system is building up to its maximum pressure.

A varied-capacity system in accordance with the preferred embodiment of the present invention would vary along the line 122 showing an immediate drop in the pressure in the brake system to approximately 150 psi and a gradual increase in that pressure beginning in about two-tenths of a second, reaching full releasing pressure of approximately 350 psi at approximately eight-tenths of a second. Thus the brakes would be very gradually released under the varied-capacity system. This permits the clutch of the system to gradually take up the energy for propelling the vehicle in a reverse direction from that in which it was previously going.

From the above description it is seen that there is provided a control system for applying vehicle brakes during a transmission directional shift from certain minimum vehicle speeds. The brakes are automatically applied during the shift of the vehicle provided a certain minimum speed is established in the vehicle such as either a gear ratio or output speed of the vehicle itself.

While the present invention has been illustrated by means of specific embodiments, it is to be understood that numerous changes and modifications may be made therein without departing from the spirit and scope of the invention as defined in the appended claims.

The embodiments of the invention in which an exclusive property or privilege is claimed are defined as follows:

1. In a vehicle having forward and reverse drive through a transmission including hydraulically actuated forward and reverse clutches, a transmission control system responsive to directional shifts of said hydraulically actuated forward and reverse clutches to provide a modulated pressure signal, and hydraulically release brakes, the combination comprising;

a first source of pressurized hydraulic fluid;
speed sensing means for generating a first pressure signal in response and proportional to the output from said transmission;
means for applying said brakes;
directional selector valve means communicating with said first source of pressurized hydraulic fluid and said transmission and shiftable to forward and reverse positions for respectively selectively directing pressurized hydraulic fluid from said first source of pressurized hydraulic fluid to either one of said forward or reverse clutches and to the means for applying said brakes and simultaneosly communicating said transmission control system modulated pressure signal to said means for applying said brakes;
said means for applying said brakes comprising sequence valve means, dump valve means, and reducing valve means;
said sequence valve means communicating with said directional selector valve means and responsive to said modulated pressure signal for controlling communication of pressurized hydraulic fluid to the dump valve means from the directional selector valve means;

said dump valve means interposed between said sequence valve and said reducing valve means and responsive to said first pressure signal for controlling communication of pressurized hydraulic fluid from said sequence valve means to said reducing valve means; and said reducing valve means variably responsive to pressurized hydraulic fluid received from said dump valve means for communicating variable hydraulic fluid pressure from said first source of pressurized hydraulic fluid to said brakes for controlling the release of said brakes.

2. The combination set forth in claim 1 wherein the means for generating a first pressure signal comprises a fluid container rotatably driven by the output of said transmission and containing a fluid; and pitot tube means extending into said fluid in said fluid container for receiving fluid pressure resulting from the velocity of said fluid with respect thereto; and conduit means for communicating said fluid pressure to the dump valve means.

3. The combination set forth in claim 1 wherein the means for a generating a first pressure signal comprises an electrical generator driven by the output shaft of said transmission for generating an electrical signal proportional to the speed thereof; and an electrically actuated valve responsive to said electrical signal for controlling communication of pressurized fluid from said first source to the dump valve means.

4. The combination set forth in claim 1 wherein the means for generating a first pressure signal in response and proportional to the output from said transmission comprises a speed selector valve means forming a portion of said transmission control system; and conduit means communicating fluid pressure from said speed selector valve means to the dump valve means.

5. The combination of claim 2 wherein said sequence valve means includes detent means for resisting shifting of said valve for maintaining communication of fluid from said first source to the dump valve means upon initial shifting of the directional selector valve means to either one of said foward or reverse positions and permitting shifting of said sequence valve after a predetermined build-up of modulated pressure for blocking said communication.

6. The combination of claim 5 further comprising a fluid sump wherein said dump valve means is normally biased to a first position for communicating fluid communicated thereto from said sequence valve means to said fluid sump, and further is responsive to the first pressure signal for cutting off said communication to said fluid sump and for directing said pressurized hydraulic fluid to said reducing valve means.

* * * * *